United States Patent [19]

Fujita

[11] Patent Number: 4,518,454

[45] Date of Patent: May 21, 1985

[54] MANUALLY-OPERATED LABELER

[75] Inventor: Mituo Fujita, Sakatoshi, Japan

[73] Assignee: Kabushiki Kaisha Shinsei Industries, Toyko, Japan

[21] Appl. No.: 414,033

[22] Filed: Sep. 2, 1982

[30] Foreign Application Priority Data

Sep. 26, 1981 [JP] Japan ................................ 56-153400
Nov. 9, 1981 [JP] Japan ................................ 56-178308

[51] Int. Cl.$^3$ .......................... B44C 3/00; B32B 1/00; B65H 1/00

[52] U.S. Cl. .................................... 156/541; 156/579; 156/584; 156/DIG. 48; 156/387; 271/311; 101/288

[58] Field of Search ............... 156/384, 387, 541, 577, 156/579, 584, DIG. 49, DIG. 45, 277, DIG. 48; 101/288, 292, 291; 271/307, 311

[56] References Cited

U.S. PATENT DOCUMENTS

| | | | |
|---|---|---|---|
| 3,265,553 | 8/1966 | Kind | 156/384 |
| 4,008,119 | 2/1977 | Hermann | 156/541 |
| 4,144,809 | 3/1979 | Sato | 101/288 |
| 4,156,627 | 5/1979 | Hamisch, Jr. | 156/277 |
| 4,276,828 | 7/1981 | Sato | 101/288 |
| 4,301,729 | 11/1981 | Fujita | 156/541 |
| 4,369,085 | 1/1983 | Hermann | 156/541 |
| 4,377,435 | 3/1983 | Fujita | 156/584 |
| 4,382,835 | 5/1983 | Sato et al. | 156/384 |

FOREIGN PATENT DOCUMENTS

| | | | |
|---|---|---|---|
| 2460444 | 12/1974 | Fed. Rep. of Germany . | |
| 55-41401 | 3/1980 | Japan | 271/307 |
| 1424545 | 2/1976 | United Kingdom . | |
| 1482188 | 8/1977 | United Kingdom . | |

OTHER PUBLICATIONS

Xerox Disclosure Journal, Movable Pressure Roll Fingers, pp. 217, 218, vol. 5, No. 2, Mar.,Apr./80.

*Primary Examiner*—Edward Kimlin
*Assistant Examiner*—Louis Falasco
*Attorney, Agent, or Firm*—Wenderoth, Lind & Ponack

[57] ABSTRACT

The labeler in accordance with the present invention is constructed so that a plurality of labels which are consecutively stuck onto a carrier strip are separated in sequence from the carrier strip by turning back the carrier strip at the carrier strip turnback part and intermittently feeding said carrier strip along with the rotational movement of the feed drum. Two feed rollers which depress the carrier strip onto the feed drum are provided. A circular guide member which forms a clearance for feeding the carrier strip between said guide member and the outer periphery of the feed drum is provided between said two fed rollers, and a pivotable frame is provided between the feed rollers for which said guide member is not provided, and a stripper is provided on the inside of the pivotable frame to separate the carrier strip fed by the feed drum from said feed drum. The pivotable frame is provided with a cutter edge for cutting the carrier strip so that the carrier strip separated at the carrier strip turnback part can be cut.

7 Claims, 5 Drawing Figures

MANUALLY-OPERATED LABELER

BACKGROUND OF THE INVENTION

The present invention relates to a manually-operated labeler which is adapted to separate and forward labels in sequence from the carrier strip by turning back the carrier strip onto which a plurality of labels are stuck consecutively at a carrier strip turnback part while intermittently feeding the carrier strip.

This type of labeler is provided with a feed drum which engages with the carrier strip to feed the carrier strip, and said labeler is provided with a circular guide member which positioned to form a carrier strip feeding clearance between said guide member and the outer periphery of the feed drum, and a feed-in roller for feeding the carrier strip into said carrier strip feeding clearance is positioned at one end of said guide member and a feed-out roller for feeding the carrier strip out of the carrier strip feeding clearance is positioned at the other end of said guide member.

In such carrier strip feeding device, there is a possibility that the carrier strip will be fed back into the carrier strip feeding clearance by the feed-in roller if the carrier strip fed from the feed-out roller is not separated from the feed drum.

Moreover, this type of labeler is disadvantageous in that external small material such as, for example, dust are carried by the feed-in roller into the carrier strip feeding clearance if two feed rollers are opposed to the feed drum, and that the outer periphery of the feed drum is covered and the cleaning of the feed drum is obstructed by the cutter for cutting the carrier strip fed from the feed-out roller since said cutter should be provided near the feed-out roller.

An object of the present invention is to provide a labeler in which the carrier strip fed from the feed-out roller to the outside is positively separated from the feed drum.

Another object of the present invention is to provide a labeler in which a label stuck on the carrier strip can be easily separated from the carrier strip by a projection which is provided on the external surface of said covering member when the label comes in contact with the covering member.

BRIEF DESCRIPTION OF THE DRAWINGS

In order that the invention may be more fully understood, preferred embodiments are now described with reference to the accompanying drawings, in which.

SUMMARY OF THE INVENTION

The present invention provides a manually-operated labeler which intermittently feeds the carrier strip onto which a plurality of labels are consecutively stuck, turns back the carrier strip at a carrier strip turnback part and separates and forwards the labels from the carrier strip at the carrier strip turnback part, wherein the feed drum which engages with the carrier strip and is driven by a movement of the lever is employed for feeding said carrier strip. A circular guide member opposed to the outer periphery of said feed drum in the main casing is provided to form a carrier strip feeding clearance, a feed-in roller which depresses the carrier strip onto the feed drum and feeds the carrier strip into the carrier strip feeding clearance in cooperation with the feed drum and a feed-out roller which depresses said carrier strip onto the feed drum and feeds out said carrier strip from the carrier strip feeding clearance in cooperation with said feed drum are each provided along the outside of said feed drum which is not opposed to said circular guide member, and a covering mechanism which covers the outside of said feed drum is provided between said feed-in roller and the feed-out roller, said covering mechanism comprising an openable covering member provided between the feed-in roller and the feed-out roller and a locking means, which maintains said covering member closed when the covering member is closed, such as, for example a resilient engaging piece or a frictional surface provided on said covering member. Said covering member is provided with a pivotable frame which has pivot points at the side toward said feed-out roller and the side toward said feed-in roller as an end of pivotal motion and at least one stripper which is provided to positively separate the carrier strip, which is engaged with said feed drum and fed by the feed-out roller, from the feed drum inside said pivotable frame, said stripper being made of, for example, a projecting member the tip of which is inserted into a peripheral groove which is provided in the circumferential direction on the outer periphery of the feed drum.

Said pivotable frame is provided with a cutting edge such as, for example, a sawtoothed edge for cutting the carrier strip, the cutting edge being provided at the side toward the feed-out roller, whereby said carrier strip is cut as required.

At least one thin ridge extends from said feed-in roller side toward said feed-out roller side on the external surface of said pivotable frame to facilitate removal of a label which is erroneously stuck to the external surface of the pivotable frame.

DETAILED DESCRIPTION OF THE PREFERRED EMBODIMENTS

Figure 1:
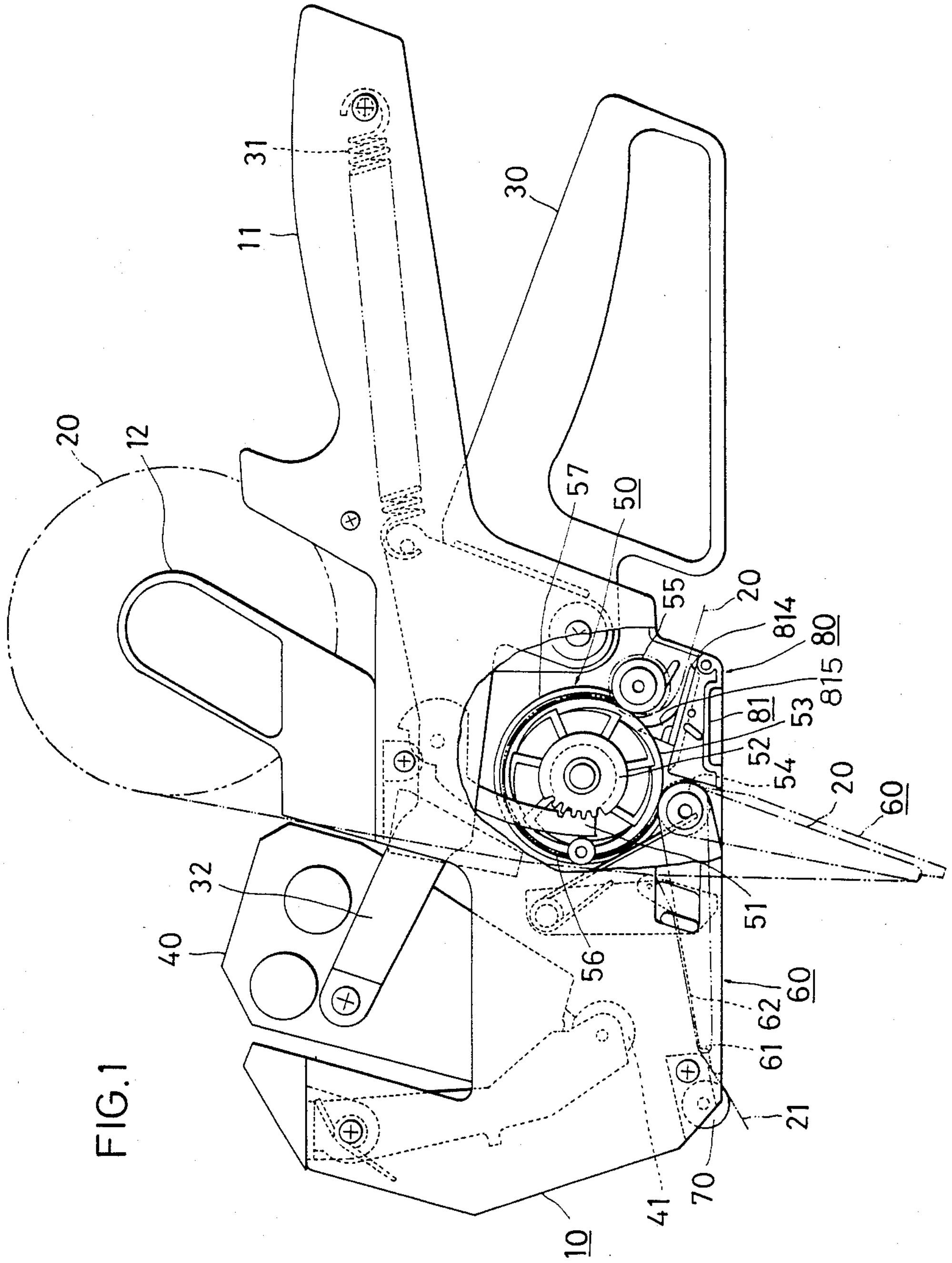
FIG. 1 is a partly cutaway side view showing the internal main part of the labeler in accordance with the present invention.

Refering to FIG. 1, the main casing 10 has a handle 11 and a holder 12 for the carrier strip 20 onto which a plurality of labels 21 are stuck.

The lever 30 which is always urged by the resetting spring 31 in the direction in which said lever 30 moves away from the handle 11 is pivoted on said main casing 10. The extension of said lever 30 in the main casing 10 is formed as an actuating part 32 which is provided with the driving means for the printing device 40 and the feeding device 50. Said printing device 40 is vertically moved in the figure as the actuating part 32 of the lever 30 is turned and is accordingly pressed on or moved away from the label receiving segment 60. The printing device 40 described thus far is a conventionally known printing device 40.

Said printing device 40 is provided with the ink roller 41 which is adapted to contact or approach the lower surface of the printing device 40 when said printing device 40 is at the uppermost position and moves away from the lower surface of the printing device 40 due to the impression force of the printing device 40 when said printing device 40 is at the lowermost position. This ink roller 41 is also constructed as in the conventional labelers.

Said feeding device 50 is provided with driving means such as, for example, a rack gear 51, one-way clutch 52 which engages with said rack gear 51 and feed drum 53 which is coupled to said one-way clutch 52.

Said feed drum 53 has the feed rollers 54 and 55 positioned adjacent thereto which depress the carrier strip onto the feed drum at the carrier strip feed-in side and the carrier strip feed-out side, respectively, and a circular guide member 57 is provided along and spaced from the circumference of the feed drum 53 between said feed rollers 54 and 55.

Said feed-in roller 54 and feed-out roller 55 are mounted on said main casing 10 so that these rollers are located outside said feed drum 53, and said circular guide member 57 is housed in the main casing and opposed to the outer periphery of said feed drum 53 in the main casing.

Figure 2:
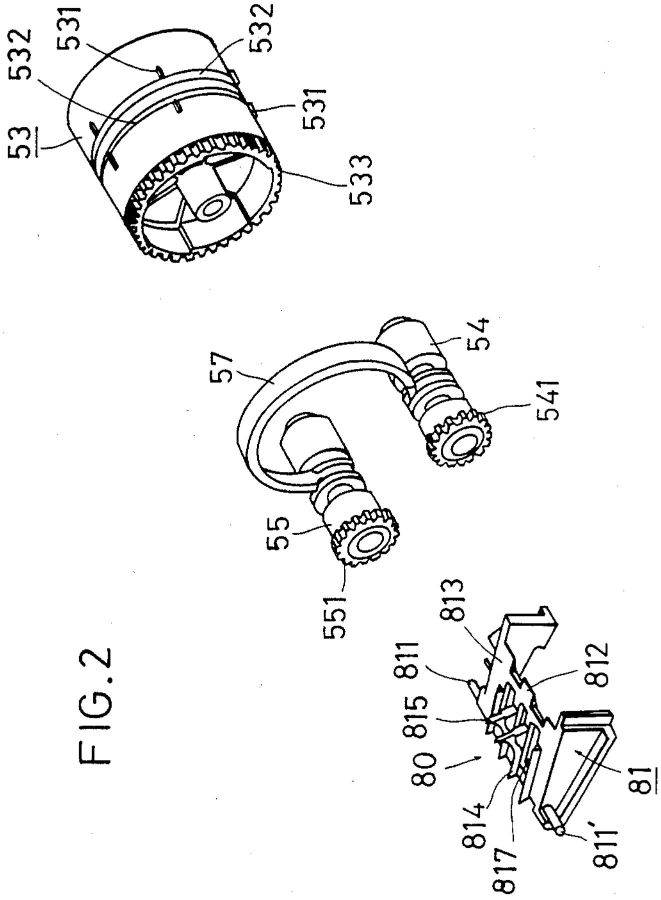
FIG. 2 is an exploded perspective view showing the feed drum, feed rollers and the parts of the covering mechanism which are employed in said labeler.

Said feed rollers 54 and 55 and said guide member 57 are fabricated as a single assembly as shown in FIG. 2, and the feed rollers 54 and 55 are provided with gears 541 and 551 which engage with the gear 533 provided on the other periphery of the feed drum 53.

Said feed drum 53 is provided with engaging projections 531 at specified distances on the outer periphery so that the carrier strip 20 engages with said engaging projections 531.

Said carrier strip 20 is provided with a number of engaging holes in sequence so that the carrier strip 20 is fed from the feed-in side to the feed-out side while said engaging projections 531 of the feed drum 53 are engaged in said engaging holes.

Said label receiving segment 60 is pivoted on the main casing 10 coaxially with the feed-in roller 54 of the said feeding device 50 as shown in FIG. 1, and a turnback edge 61 which turns back the carrier strip 20 is formed at the free end thereof and the surface near the turnback edge 1 is a resilient receiving surface 62, the printing device 40 being applied to the label 21 stuck on the carrier strip 20 as it overlies said resilient receiving surface 62 to place the printing onto the label 21.

A depression member such as, for example, depression roller 70 is provided ahead of said label receiving segment 60 and the printed label 21 is depressed and stuck onto an article by said depression roller 70.

The covering mechanism 80 is positioned at the feed-out side of said feeding device 50 and is provided with a covering member 81 and a locking means which locks said covering member.

Figure 3:
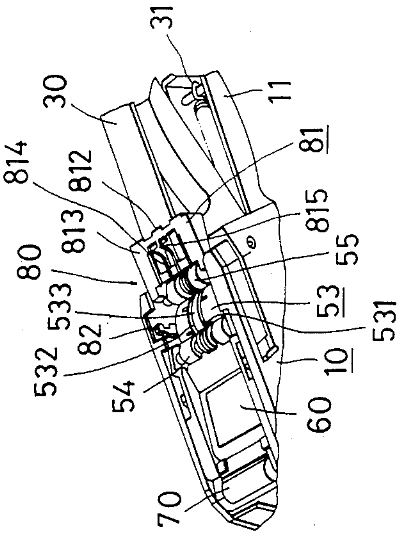
FIG. 3 is a perspective view of the main part of the bottom of the labeler, showing the condition when said covering mechanism is opened.

Said covering member 81 has a pivotable frame 813 which has the pivot shafts 811 and 811' engaged with casing 10 below said feed-out roller 55 and a free end 812 which extends to a position near the feed-in roller 54, a cutter, for example the sawtoothed edge 814, which is provided at the pivoted end parallel with said feed-out roller 55 of said pivotable frame 813 and stripper 815 which is provided on the internal surface of said pivotable frame 813 so that said stripper extends into at least one circumferential groove provided on the outer periphery of said feed drum 53. Said covering member 81 is constructed so that it can be pivoted around said pivot shafts 811 and 811' as required as shown in FIG. 3 and can be opened to observe the body of the feed drum 53 from the bottom of the main casing 10.

Figure 4:
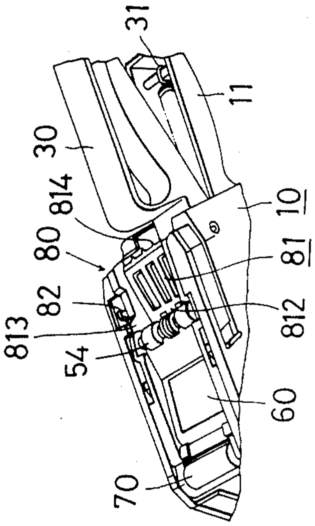
FIG. 4 is a perspective view of the main part of the bottom of the labeler, showing the condition when said covering mechanism is closed.

A locking means is provided to lock said covering member 81 when the covering member is closed as shown in FIG. 4 and, in the embodiment, said locking means is a resilient engaging member 82 which engages with the covering member 81.

The labeler of the present invention is as described above. If the lever 30 is operated several times after the label receiving segment 60 is turned as shown with a 2-dot broken line in FIG. 1, the carrier strip 20 is inserted between the feed-in roller 54 and the feed drum 53 and the label receiving segment 60 is returned to the position shown by the solid line. The feed drum 53 is rotated by the returning motion of the lever 30, the carrier strip 20 is automatically fed into the carrier strip feeding clearance 56 by the feed drum 53 and the feed-in roller 54 and automatically fed out from the carrier strip feeding clearance 56 by the feed-out roller 55, so that the carrier strip 20 is automatically set by the feed drum 53 and a pair of feed rollers 54 and 55.

The carrier strip 20 engaged by said feed drum 53 is separated from the feed drum 53 by the stripper 815 which is inserted into the circumferential groove 532 and fed out of the main casing 10 while being guided by the internal surface of the pivotable frame 813. The carrier strip 20 fed out of the maain casing 10 can be cut as required by the sawtoothed edge 814.

In case of this labeler, the outer periphery of the feed drum 53 can be partly exposed by turning said covering member 81 as shown in FIG. 3 and therefore the outer periphery can be cleaned and, if the covering member 81 is closed as shown in FIG. 4, the feed drum 53 can be protected from deposit of foreign matter.

In the embodiment, since the pivotable frame 813 of said covering member 81 is provided with the stripper 815 and the cutter 814, the stripper 815 and the cutter 814 can be set at the specified positions or removed from the specified positions simply by pivoting the pivotable frame 813.

Figure 5:
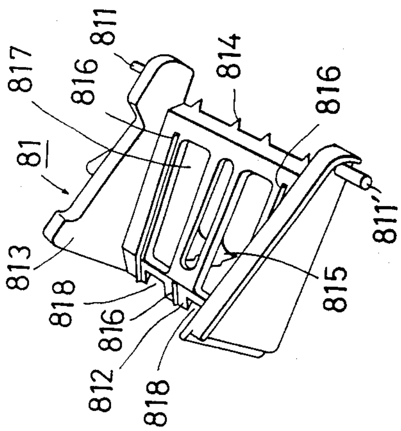
FIG. 5 is a perspective view showing another embodiment of said covering member.

The pivotable frame 813 of said covering member 81 is preferably provided with at least one ridge 816 extending from the feed-in roller 54 toward the feed-out roller 55 as shown in FIG. 5. The carrier strip 20 has a number of labels on its whole length when the carrier strip 20 is set on the labeler. When the carrier strip 20 is set on the feed drum 53, the labels on the carrier strip 20 ahead of the carrier strip turnback part 61 should be removed by hand. Actually, in many cases, a label which is inadvertently left on the carrier strip 20 is separated at the feed-in roller 54 and pushed up and stuck onto the external surface of the pivotable frame 813. If the ridge 816 as described above is provided on the pivotable frame 813, the label stuck on the pivotable frame 813 can be easily removed.

Said pivotable frame 813 is preferably provided with a window 817 and a cutaway part 818 through which the engaging projection 531 of the feed drum 53 can pass.

What is claimed is:

1. A manually operated labeler, comprising:

a main casing having a holding part for holding a roll of carrier strip onto which a plurality of labels are stuck consecutively;

a carrier strip turnback part which turns back the carrier strip as it is drawn from said holding part over said carrier strip turnback part to strip the labels from the carrier strip;

a feeding device having a feed drum for engaging the carrier strip and drawing it over said carrier strip turnback part;

a driving means connected to said feeding device for driving said feeding device to intermittently draw the carrier strip over said carrier strip turnback part;

a circular guide member positioned along an outer periphery of said feed drum in said main casing and spaced from said feed drum to define a carrier strip feeding clearance between said circular guide member and the outer periphery of said feed drum;

a feed-in roller on said main casing adjacent said feed drum ahead of, relative to a direction of the movement of the carrier strip, for feeding the carrier strip into said carrier strip feeding clearance in cooperation with said feed drum, and a feed-out roller on said main casing adjacent said feed drum behind, relative to the direction of movement of the carrier strip, for feeding the carrier strip from said carrier strip feeding clearance in cooperation with said feed drum; and a pivotable frame positioned between said feed-in roller and said feed-out roller around the part of said feed drum other than that along which said circular guide member is positioned and pivotable independently of said feed-in and feed-out rollers into and out of a position in which said pivotable frame substantially covers the outer periphery of said feed drum between said feed-in and feed-out rollers, said pivotable frame having at least one stripper thereon which projects into the path of the carrier strip when said pivotable frame is in said position for separating the carrier strip from said feed drum.

2. A labeler as claimed in claim 1 wherein said feed drum has at least one circumferential groove in the outer periphery thereof and the tip of said stripper extends into said circumferential groove when said pivotable frame is in said position.

3. A labeler as claimed in claim 1 wherein said pivotable frame is pivotally mounted at a position near said feed-out roller and the free end is toward said feed-in roller when said pivotable frame is in said position.

4. A labeler as claimed in claim 1 wherein said pivotable frame has a cutting means thereon adjacent said feed-out roller when said pivotable frame is in said position for cutting the carrier strip.

5. A labeler as claimed in claim 4 wherein said cutting means is a sawtooth edge.

6. A labeler as claimed in claim 1 wherein said pivotable frame has at least one ridge thereon on the side facing away from said feed drum when said pivotable frame is in said position and said ridge extending from the free end to the pivoted end of said pivotable frame.

7. A labeler as claimed in claim 1 further comprising a turnable label receiving segment positioned along the bottom of the main casing for closing the bottom of the main casing and having one end pivoted to said main casing coaxially with the axis of rotation of said feed-in roller and having said carrier strip turnback part at the free end thereof, whereby the bottom of the main casing can be opened by pivoting said label receiving segment away from said main casing.

* * * * *